United States Patent [19]

Kobayashi et al.

[11] Patent Number: 5,290,629
[45] Date of Patent: Mar. 1, 1994

[54] MAGNETIC FILM HAVING A MAGNETIC PHASE WITH CRYSTALLITES OF 200 A OR LESS AND AN OXIDE PHASE PRESENT AT THE GRAIN BOUNDARIES

[75] Inventors: Toshio Kobayashi, Tokyo; Ryoichi Nakatani, Akigawa; Hitoshi Nakamura, Hachioji; Nagatugu Koiso, Tama, all of Japan

[73] Assignee: Hitachi, Ltd., Tokyo, Japan

[21] Appl. No.: 638,774

[22] Filed: Jan. 8, 1991

[30] Foreign Application Priority Data

Jan. 8, 1990 [JP] Japan .................. 2-000670

[51] Int. Cl.$^5$ .............................. G11B 5/00
[52] U.S. Cl. .................................. 428/332; 428/336; 428/611; 428/635; 428/668; 428/681; 428/694 T; 428/694 TM; 428/693; 428/900; 428/928
[58] Field of Search ............... 428/694, 900, 701, 336, 428/611, 681, 668, 928, 694 T, 332, 635, 693, 694 TM; 148/306, 311, 313; 252/62.55, 62.56, 62.59

[56] References Cited

U.S. PATENT DOCUMENTS

| | | | |
|---|---|---|---|
| 4,766,034 | 8/1988 | Sato et al. | 428/336 |
| 4,828,905 | 5/1989 | Wada et al. | 428/213 |
| 4,836,865 | 6/1989 | Sakakima et al. | 148/306 |
| 4,858,049 | 8/1989 | Kobayashi et al. | 360/126 |
| 4,920,013 | 4/1990 | Kobayashi et al. | 428/694 |
| 4,935,314 | 6/1990 | Kobayashi et al. | 428/694 |

FOREIGN PATENT DOCUMENTS 59-009905 1/1984 Japan .

OTHER PUBLICATIONS

Kobayashi, Toshio et al "Fe-C Formation by Dual Ion Beam Sputtering" J. Appl. Phys. 61(12) Jun. 15, 1987.

*Primary Examiner*—Stevan A. Resan
*Attorney, Agent, or Firm*—Antonelli, Terry, Stout & Kraus

[57] ABSTRACT

A ferromagnetic film which comprises ferromagnetic metal in which an oxide phase is present, a method for producing it, and a magnetic head in which said ferromagnetic film is used are disclosed. The ferromagnetic metal includes iron and cobalt and the oxide phase contains preferably at least one element selected from IVa, Va and VIa group elements.

18 Claims, 2 Drawing Sheets

MAGNETIC FILM HAVING A MAGNETIC PHASE WITH CRYSTALLITES OF 200 A OR LESS AND AN OXIDE PHASE PRESENT AT THE GRAIN BOUNDARIES

BACKGROUND OF THE INVENTION

The present invention relates to magnetic head materials used for magnetic disc devices, VTR and the like and particularly, to a ferromagnetic film having a high saturation magnetic flux density, high permeability, high thermal stability, high corrosion resistance, and reaction resistance and a magnetic head which uses the ferromagnetic film.

Recently, magnetic recording techniques have been remarkably developed and improvement of recording density has been hastened. In order to enhance recording density, it is necessary to use recording mediums of high coercivity and in order to magnetize the recording mediums of high coercivity, magnetic pole materials having a high saturation magnetic flux density are required. Therefore, Ni-Fe alloy (Permalloy) or Co based amorphous alloy thin films have began to be used in place of conventional ferrites as magnetic pole materials. Furthermore, magnetic pole materials are required to have a high permeability in addition to a high saturation magnetic flux density for improvement of read/write efficiency. Moreover, magnetic pole materials are also required to have a thermal stability enough to stand the heating step for filling with glass in the process for the formation of a magnetic head to maintain the high permeability.

As such magnetic pole materials, materials made by the simultaneous addition of Nb, Zr, Ti, Ta, Hf, Cr, W, or Mo and nitrogen to a metal selected from Fe, Co, Ni, and Mn are reported in U.S. Pat. No. 4,836,865. A method for making this material comprises sputtering a metal target having a given composition using a mixed gas of argon and nitrogen as sputtering gas. According to this report, a film having a saturation magnetic flux density of 1.5T and a coercivity of 1 Oe or less has been obtained by alternately laminating a nitrided layer and un-nitrided layer by modulating the nitrogen concentration in the sputtering gas. The coercivity of this film can be kept at a low level until 600° C. and the thermal stability is 600° C.

Furthermore, it is disclosed in MR89-12 (1989. 7) published from The Institute of Electronics, Information and Communication Engineers that a Fe based amorphous film is formed by the simultaneous addition of Ti, Zr, or Hf and C to Fe and then this film is heat treated, thereby to obtain microcrystalline soft magnetic materials having a high thermal stability.

SUMMARY OF THE INVENTION

The inventors conducted additional tests on the content of the above-mentioned report by sputtering Fe-Nb, Fe-Ta, and Fe-Hf materials in a mixed gas of argon and nitrogen. As a result, it has been found that the film has a low coercivity of lower than 1 Oe even when heated to 400°-600° C. as reported. It has also been found that a ferromagnetic film having a coercivity of less than 1 Oe is obtained by sputtering an Fe-Hf-C material in argon and then heat treating the material at 500°-600° C.

However, when the inventors produced on an experimental basis a metal-in-gap type head by forming such a conventional material on an Mn-Zn ferrite single crystal substrate and subjecting it to the heat treatment at 600° C. for filling with glass, it has become clear that the Mn-Zn ferrite single crystal substrate reacts with a magnetic film to form an oxide layer at the interface. When the read/write characteristics of a magnetic head were examined, a large contour signal based on a nonmagnetic layer at the interface between a crystal substrate and a magnetic film was observed as expected. When such a contour signal is observed, normal reading/writing cannot be performed. Furthermore, in this case, the reaction between the magnetic film and the filler glass was observed, and it was seen that the magnetic film became thinner. That is, it has been found that the conventional magnetic film shows excellent soft magnetic properties as a single magnetic film, but when a magnetic head is produced through the glass bonding process, reaction with the substrate or filler glass must be inhibited.

On the other hand, when a film formed on a glass substrate as a dummy sample was subjected to salt spray testing and testing at a constant temperature and constant humidity to evaluate the corrosion resistance of the film, it was found that the sample was very easily corroded as compared with a conventionally used Sendust film or Co-Nb-Zr type film and thus, use of it as a magnetic film was questionable.

Therefore, the object of the present invention is to provide a novel magnetic head material free from the defects in the conventional techniques.

The inventors have conducted intensive research in an attempt to solve the above problems and, as a result, a magnetic head material which not only maintains the saturation magnetic flux density and soft magnetic properties even at high temperatures, but also is high in resistance to the reaction with oxides such as ferrites or glass and is also high in corrosion resistance, has been developed by incorporating an oxide into a ferromagnetic metal. The oxide here includes substances comprising oxygen and an element of Groups IVa, Va and VIa, which have a bond such as Hf-O, Nb-O, Ta-O, Ti-O, Zr-O, V-O, W-O, Mo-O, or the like. Besides, additives for improving magnetic properties (decreasing coercivity and increasing specific permeability) may be added. Especially, for improvement of the soft magnetic properties, addition of B, C, N, or P is effective. Furthermore, for improvement of corrosion resistance, addition of Ni, Rh, Ru, Pd, Zr, Nb, Ta, Ag, Os, Ir, Pt, Au, Cr, Mo, W, or Ti is effective.

The ferromagnetic film of the present invention comprises a metallic phase in which an oxide phase is incorporated. There is no limitation in a method of the incorporation of the oxide phase, and even if any oxide is not present at the time of the formation of the ferromagnetic film, the oxide may be produced by the heat treatment and the like. It is also possible to previously incorporate it in the oxide form into the film at the time of the formation of the ferromagnetic film. For example, there may be employed any of methods of the lamination of a metal layer and an oxide layer, the lamination of a metal layer and a layer of an element which composes oxides with the metal and the simultaneous deposition of a metal and an element which composes oxides.

Magnetic recording devices excellent in write/read efficiency can be obtained by using the ferromagnetic film of the present invention as magnetic core of magnetic head. Especially, further advantageous effect can be obtained when the ferromagnetic film of the present invention is applied to a magnetic head made by a method which includes a glass bonding step, such as a metal-in-gap type head.

As explained above, the saturation magnetic flux density and soft magnetic properties are maintained even at high temperatures, but the mechanism therefor is not necessarily fully elucidated. However, as a result of studying by the inventors, it has been found that the heating of the ferromagnetic film containing an oxide to 600° C. results in substantially no enlargement of crystallite size, and the oxide inhibits the diffusion of elements constituting the ferromagnetic film and prevents the growth of crystallites due to heating. The film heated to 600° C. was analyzed by high resolving power EPMA (Electron Probe Micro Analysis method). As a result, the oxide phase was observed around crystallites which constitute ferromagnetic film and it has been found that the crystallite growth (enlargement) constituting the ferromagnetic film is inhibited by the presence of this phase. It has been known that except for materials which have a magnetocrystalline anisotropy constant of nearly zero, the soft magnetic properties of ferromagnetic materials have a relation with the size of the crystallites which constitute the ferromagnetic materials, and with increase in the size of the crystallites the soft magnetic properties deteriorate. Accordingly, it is considered that similarly, since the crystallites of the ferromagnetic film of the present invention are maintained at a small size, any deterioration of the soft magnetic properties do not occur. However, when the same film was examined by an X-ray diffraction method, no oxide was detected and thus the substance was either present in a slight amount or in an amorphous state.

Furthermore, the saturated magnetic flux density of the ferromagnetic film of the present invention has showed a tendency to decrease with increase in the amount of the oxide added, which is considered to be due to simple dilution of the magnetic material by addition of the non-magnetic material.

DETAILED DESCRIPTION OF THE PREFERRED EMBODIMENT

Figure 3A:
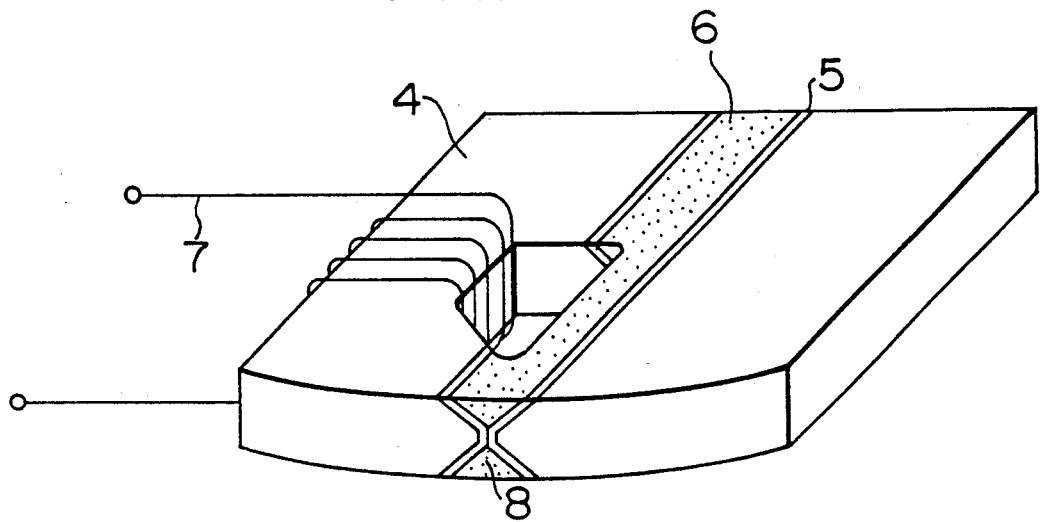
FIG. 3A is an oblique view of the magnetic head of the present invention.

The present invention will be illustrated by the following examples referring to the drawings.

EXAMPLE 1

Ferromagnetic films mainly composed of Fe and/or Co were formed on crystallized glass substrates using an ion beam sputtering apparatus. The ion beam sputtering apparatus used in this example was provided with two ion guns, one of which carries out sputtering of a target and can deposit sputtered particles on a substrate and the other of which can clean the substrate. The target holder of this apparatus is of a revolving type and four kinds of targets at maximum can be mounted thereon. Optional one of them can be selected to perform the sputtering. Therefore, an optional laminate film can be formed from these target materials. Such an apparatus is known (see Journal of APPLIED PHYSICS, Vol. 61, No. 12, June 15, 1987). Targets of ferromagnetic metals mainly composed of Fe and/or Co and a target of oxide were alternately sputtered by this apparatus to form a laminate film. The sputtering was conducted under the following conditions.

| | |
|---|---|
| Sputtering gas: | Ar |
| Ar gas pressure in the apparatus: | $2.5 \times 10^{-2}$ Pa |
| Acceleration voltage of the ion gun for deposition: | 800 V |
| Ion current of the ion gun for deposition: | 120 mA |
| Distance between the target and the substrates: | 130 mm |
| Substrate temperature: | 50–100° C. |

Figure 1:
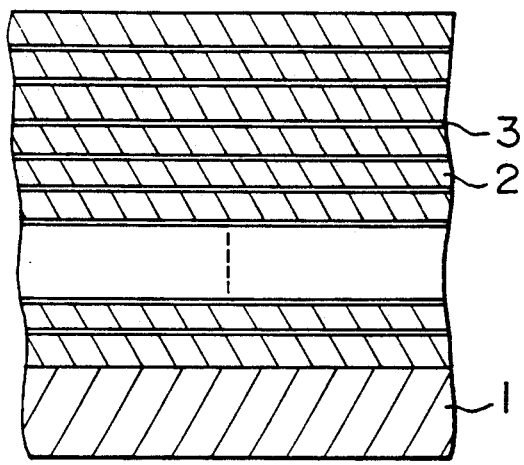
FIG. 1 is a cross-sectional view of the ferromagnetic metal film of the present invention.

The cross-sectional view of the laminate film made under the above conditions is shown in FIG. 1. In this example, the laminate film was comprised of a ferromagnetic metal layer 2 of 9 nm thick and an oxide layer 3 of 1 nm thick, which was produced using a crystallized glass substrate as substrate 1. Since the total thickness of the laminate film was 1 μm in this example, this laminate film totally consisted of 100 ferromagnetic metal layers 2 and 99 oxide layers 3.

The resulting laminate films were heat treated at 100°–700° C. for 1 hour in Ar gas and evaluation of the soft magnetic properties of the respective films and crystallographical evaluation of the films by X-ray diffraction were conducted and confirmation of presence of the oxide layer by analysis was conducted.

The results are shown in Table 1. In Table 1, with reference to the ferromagnetic metal film and oxide, the compositions of the target at the formation of film are shown. In the case of an ideal film-forming process, the composition of the target may be considered to be nearly the same as that of the film formed. However, under some conditions, light elements may be expelled at the surface of the substrate and the composition of the film may be less than that of the target. The values of coercivity and corrosion test were those which were obtained by measurement after heat treatment at 500° C. for 1 hour. The coercivity was measured using a B-H curve tracer. Thermal stability was shown by a temperature at which the coercivity of the heat treated sample reached 1.5 Oe or more. The corrosion test was conducted by intermittently spraying a 0.5% aqueous NaCl solution onto the sample which was kept at 35° C., and the result was shown by a time required before corrosion progressed by 5%. Here, the progress of the corrosion was measured by the reduction of a magnetization of the sample.

As a result, a ferromagnetic film having excellent soft magnetic properties of 1.5 Oe or less even at a high temperature of 600° C. was able to be obtained by laminating ferromagnetic metal films mainly composed of Fe and/or Co through the intermediary of an oxide of element of Groups IVa, Va and VIa of the Periodic Table. The results of the corrosion test show that all the samples had a corrosion resistance of at least 50 days. A multi-layer film including a ferromagnetic metal film mainly composed of Fe and/or Co to which an element such as B, C, N or the like was added, was similarly produced and was evaluated to obtain a similar corrosion resistance except a coercivity decreased by 5–15%. The inventors have reported in U.S. Pat. No. 4,858,049 that effect of reduction in coercivity was obtained by adding 5–20 at% of B, N, C, or P, and it is supposed that similar effects have been obtained. Moreover, further improvement of the corrosion resistance can be expected by further adding to such a ferromagnetic metal at least one element selected from Ni, Rh, Ru, Pd, Zr, Nb, Ta, Ag, Os, Ir, Pt, Au, Cr, Mo, W, Ti, Bi, V, Co, and Cu. Effect of addition of these elements is disclosed in U.S. Pat. No. 4,935,314 by the inventors.

For comparison, multi-layer films were prepared using a boride, carbide and nitride of elements of Groups IVa, Va and VI in place of oxide. However, these films were found to be very low in corrosion resistance. That is, it is guessed that when the boride, carbide or nitride is incorporated, the films are oxidized and corroded if they are exposed to a salt in the air for a long time, because these compounds easily change to oxides with a lower energy. Furthermore, when a film of 1 $\mu$m was prepared from only Fe and Co and heat treated, the enlargement of crystallite size occurred at 400° C. and the coercivity increased to higher than 5 Oe. Thus, it is clear that the thermal stability and corrosion resistance are improved by incorporating oxide materials of Ti, Zr, Hf, V, Nb, Ta, Cr or the like into ferromagnetic metal films.

As a result of observation of the cross-sectional structure of the laminate film heat treated at 600° C. by an electron microscope, it was found that the laminate structure was maintained even after the heat treatment at 600° C. and the high melting point oxides inhibited the growth of crystallites of the ferromagnetic metal films. Separately, the inventors carried out the lamination of these ferromagnetic metal films through the intermediary of a metal film such as of Ni or Cr in place of the oxide and heat treated the films at 600° C. and observed the cross-sectional structure to find that the ferromagnetic metal film and the intermediary metal film completely diffused into each other, and no laminate structure was recognized and, besides, the enlargement of crystallite size occurred and some of the crystallites formed a single crystal from the surface of the film to the interface with the substrate.

There is no special limitation in thickness of the intermediary film in the present invention, but when the proportion of the intermediary film of non-magnetic material increases in the laminate film, the saturation magnetic flux density decreases owing to the effect of simple dilution. This is not preferred. From this viewpoint, the intermediary film should preferably be as thin as possible. However, as disclosed in Japanese Patent Kokai (Laid-Open) No. Sho 59-9905, when a crystalline ferromagnetic metal film and an intermediary layer different therefrom are laminated, the crystalline structure of the ferromagnetic metal film can be made finer and suitable magnetic properties can be obtained. In order to expect the effect of such intermediary layer, it is necessary that the thickness of the intermediary layer is 1 nm or more. It is considered that when the intermediary layer of 1 nm or more in thickness and the ferromagnetic metal layer are laminated by sputtering, the crystal structure of the ferromagnetic metal layer becomes finer and even when this is heated, the oxide of the intermediary layer penetrates into the grain boundry of the ferromagnetic metal layer to inhibit enlargement of crystallites.

As a result of examination of the magnetic film of the present invention by an X-ray diffraction method, it was found that the crystal structure of the film heat treated at 600° C. was in a body-centered cubic form when the film was mainly composed of Fe, and was in a hexagonal closed packing form when it was mainly composed of Co. In this case, these Fe and Co constituted a single phase having no other crystal structure. Therefore, Fe and Co do not form non-ferromagnetic substances having other crystal structures (for example, Y-Fe, $Fe_3C$, $Fe_2O_3$) and a high saturation magnetic flux density of 1.7 T or higher was obtained even after the heat treatment at 600° C. or higher.

EXAMPLE 2

Laminate films were prepared in the same manner as in Example 1 using a target comprising a ferromagnetic metal to which oxygen was added and a target comprising a metal of Groups IVa, Va and VIa. The target comprising the ferromagnetic metal to which oxygen was added was prepared by mixing Fe with $Fe_2O_3$ or Co with CoO. Results obtained are shown in Table 2. In Table 2, the compositions of the ferromagnetic film and the metal are shown by those of the targets at the time of formation of the film. The values of the coercivity and crystallite size were those measured after heat treatment at 600° C. for 1 hour. Corrosion resistance was measured by salt spray testing in the same manner as in Example 1.

As a result, the ferromagnetic films having excellent soft magnetic properties of 1.1 Oe or less in coercivity even at a high temperature of 600° C. were obtained by laminating the ferromagnetic metal films mainly composed of Fe and/or Co to which oxygen was added between which a metal of Groups IVa, Va and VIa was incorporated.

It was found that the crystallite size at this time was maintained at 200 Å or less. The crystallite size before the heat treatment was 150 Å or less and, thus, it was clear that the crystallite size did not almost change by the heat treatment. However, examination of the change of the coercivity caused by the heat treatment showed that the coercivity once increased at temperatures in the range of 300°–450° C. and when the temperature was further elevated, the coercivity again decreased. These results were different from those which were obtained when the ferromagnetic metal films were laminated through the intermediary of oxide.

Change of the saturated magnetic flux density due to the heat treatment was similar to that in Example 1 and no great change was recognized. Especially, the saturated magnetic flux density did not decrease at a temperature of higher than 600° C.

The cross-sectional structure of the laminate film heat treated at 700° C. was observed by an electron microscope, and it was seen that the laminate structure was maintained even after the heat treatment at 700° C. and the laminate structure inhibited the growth of the crystallites of the ferromagnetic metal film. Furthermore, as a result of analysis of these ferromagnetic metal laminate films by a high resolution power electron probe micro analysis method, it can be considered that the oxygen added to the ferromagnetic films also gather at the part of the metal layer inserted as an intermediary layer and an oxide is formed. Moreover, it was found that a part of the inserted metal diffused and existed so that it covered the crystallites which constituted the ferromagnetic films. It is considered that the added carbon and boron also exist there and a carbide or boride are also simultaneously present.

A film as formed by sputtering and this film heat treated at 600° C. were analyzed by XPS (X-ray photoelectron spectroscopy). As a result, a peak which shows the metal element constituting the intermediary layer before the heat treatment became smaller after the heat treatment and instead, a peak which shows the presence of an oxide of the element constituting the intermediary layer was observed. That is, it was found that the oxygen and the metal of the intermediary layer were in a bonded state (namely, oxide) in the ferromagnetic film after the heat treatment. Therefore, it is clear that the thermal stability can be improved by allowing the oxide to be present around the crystallites which constitute the ferromagnetic metal film.

The resulting magnetic films were tested on corrosion resistance in the same manner as in Example 1 and, as a result, all the samples had a corrosion resistance of at least 50 days and it has become clear that the presence of the oxide in the magnetic film inhibits corrosion.

In Example 2, other elements can also be added for the reduction of coercivity and improvement of corrosion resistance as in Example 1. Furthermore, the relation between the intermediary layer and the ferromagnetic metal layer can also be considered as in Example 1.

EXAMPLE 3

Ferromagnetic films were prepared using ferromagnetic metals shown in Table 3 as target and a mixed gas of argon and oxygen as a sputtering gas.

The results are shown in Table 3. In Table 3, the compositions of the ferromagnetic films are shown by that of the target at formation of the films. The oxygen concentration is shown by an oxygen concentration in the sputtering gas. Coercivity and corrosion resistance are shown with values measured after the heat treatment at 600° C. for 1 hour. The corrosion resistance was measured as in Example 1. As a result, the ferromagnetic films having excellent soft magnetic properties of 1 Oe or less in coercivity even at a high temperature of 600° C. were obtained by sputtering in oxygen atmosphere, the ferromagnetic metal films mainly composed of Fe and/or Co to which elements of Groups IVa, Va and VIa were added. It was found that the crystallite size was maintained at 200 Å or less. The crystallite size before the heat treatment was 150 Å or less and thus, it became clear that there occurred substantially no change in crystallite size by the heat treatment.

The corrosion resistances of the films heat treated at 600° C. were all at least 50 days. Thus, the corrosion resistance was clearly improved as compared with a corrosion resistance of 10–30 days of the magnetic films containing no oxygen.

Figure 2:
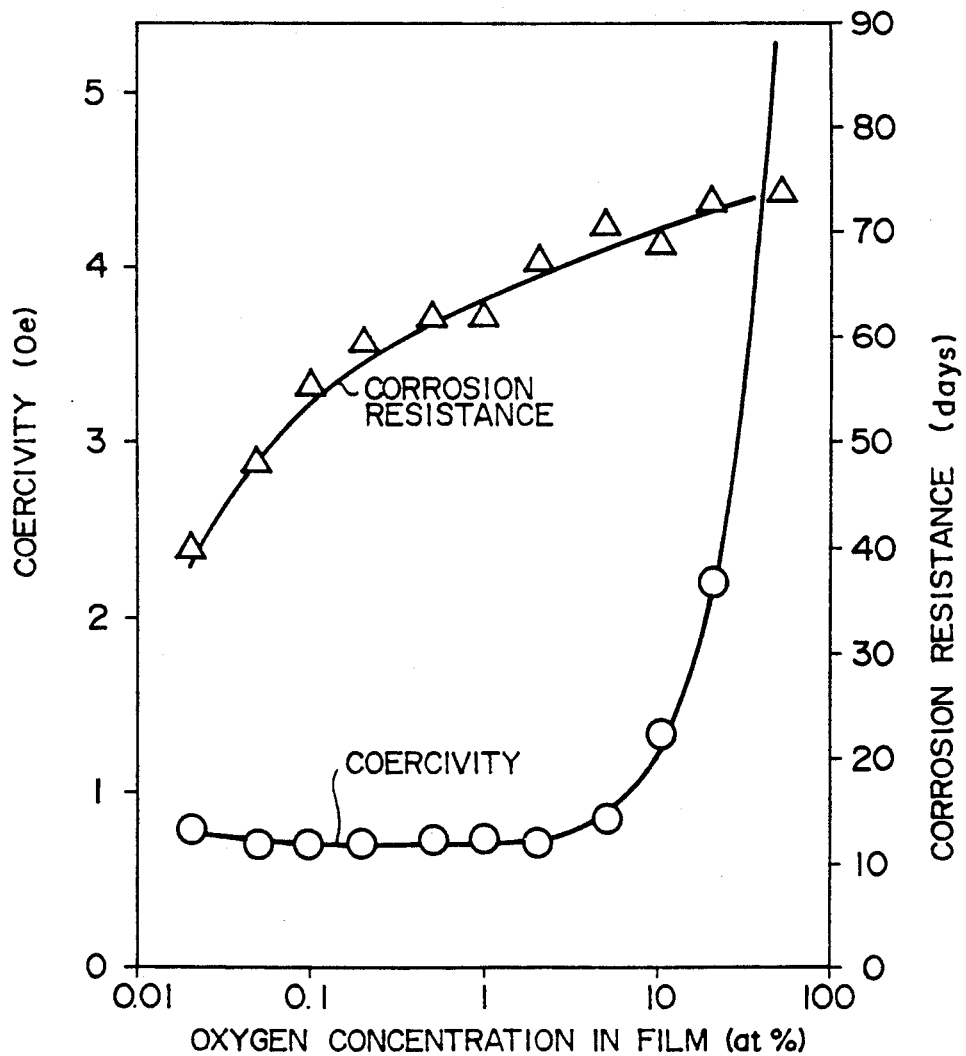
FIG. 2 is a graph which shows influence of an oxygen concentration in the film on the coercivity and corrosion resistance of the ferromagnetic film of the present invention.

When the amount of oxygen contained in the magnetic film after the heat treated was measured by an EPMA method, it was found that 5.2–8.4 at% of oxygen was present in the film. For studying the influence of oxygen content in more detail, $Fe_{86}Nb_{10}B_4$ film was subjected to sputtering with changing the oxygen concentration of the sputtering gas and, as a result, the relations between the oxygen content and the coercivity and corrosion resistance were as shown in FIG. 2. That is, it was found that in order to keep the coercivity at low values, the oxygen concentration in the film was preferably 15 at% or less, more preferably 10 at% or less and the corrosion resistance was improved with increase in the amount of oxygen. Furthermore, in order to obtain desired conditions of 2 Oe or less in coercivity and 50 days or more in corrosion resistance, the oxygen concentration in the film was 0.1–15 at%.

As a result of observation of the cross-sectional structure of the magnetic film heat treated at 600° C. by an electron microscope, the crystallite size was maintained at 200 Å or less even after the heat treatment at 600° C. and it was seen that the oxide formation inhibited the growth of crystallites of the ferromagnetic metal film. Furthermore, the inventors analyzed the ferromagnetic metal film by a high resolution power EPMA method to confirm that the oxide of an element of Groups IVa, Va and VIa was present at the grain boundary of the magnetic film. Thus, it is clear that when materials of a high melting point such as oxides are present around crystallites which constitute the ferromagnetic metal film, the thermal stability and corrosion resistance can be improved as in Example 2.

Elements to be added can be selected also in Example 3 as in Examples 1 and 2.

EXAMPLE 4

Figure 3B:
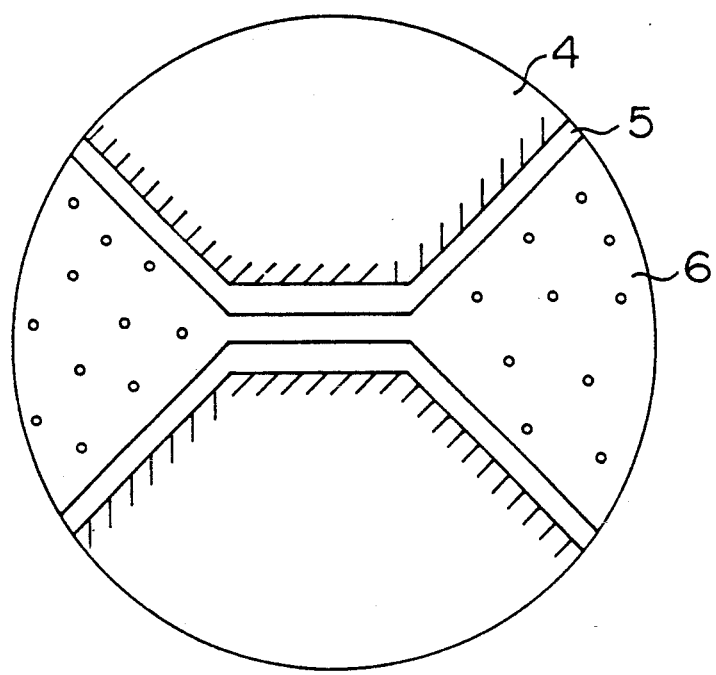
FIG. 3B is a plan view of the vicinity of the gap portion of the magnetic head of the present invention.

Magnetic poles of metal-in-gap type heads were produced using the ferromagnetic films obtained in Examples 1–3 as shown in FIG. 3 and were evaluated for the head of a high density magnetic recording apparatus. FIG. 3A is a whole oblique view of the head, and FIG. 3B shows the enlarged portion in the vicinity of the gap. A magnetic core coated with a ferromagnetic film 5 of 5 μm thick was butted against a Mn-Zn ferrite substrate 4 to form a gap 8. The length of the gap was 0.3 μm. The magnetic core was provided with a coil 7. A glass bonding temperature at the time of formation of the head was 520° C. A medium used was of 1500 Oe in coercivity. As a result, the recording characteristics of the head in which the Fe based ferromagnetic film of the present invention was used for a magnetic pole were improved by 4.6 dB and read/write output was higher by about 3 dB as compared with a conventional Sendust head. Besides, a recording density of at least 100 kBPI was obtained. This is because the saturation magnetic flux density of the ferromagnetic film of the present invention is higher than that of other materials.

Furthermore, the contour signal output due to the contour gap effect of the head was measured and, as a result, it was found that when a conventional magnetic film comprising Fe or Co to which Nb, Zr, Ti, Ta, Hf, Cr, W, or Mo and nitrogen or carbon were simultaneously added was used as a magnetic pole of head, a contour signal output of 3 to 5 dB was detected when the magnetic film of the present invention was used, the contour signal output decreased to 2 dB or less. The glass bonded portion of the head was peeled off and depth analysis from the magnetic film side towards a ferrite by an Auger electron spectroscopy was conducted. As a result, it was formed that in the case of the conventional head, an oxide layer of 50–180 Å was present at the interface between the magnetic film and the ferrite. On the other hand, in the case of the head of the present invention, the oxide layer at the interface between the magnetic film and the ferrite was at most 20 Å thick and thus, it has become clear that when the oxide phase is present in the magnetic film, the thickness of the oxide layer at the interface becomes thin, and the contour signal output decreases.

Furthermore, when the conventional magnetic film was used for a magnetic pole, the reaction between the magnetic film and the filler glass took place at glass bonding and a part of the magnetic film was converted to a film inferior in soft magnetic properties to deteriorate read/write properties of the head. In the worst case, the film of a high coercivity was formed and signal recorded in the medium is spontaneously erased. However, according to the present invention, observation of the interface between the magnetic film and the filler glass by an optical microscope did not reveal formation of the reaction product layer and high read/write properties were obtained.

In the above Examples, the magnetic film was formed by an ion beam sputtering method, but the inventors made the similar investigation using a RF sputtering method and have found that the magnetic films having nearly the same magnetic properties and thermal stability as above can be obtained only by elevating a substrate temperature to about 150° C. Therefore, the present invention is effective irrespective of a method of film formation.

As explained above in detail, the film having a high thermal stability and high saturation magnetic flux density of the present invention is superior in soft magnetic properties up to a temperature of at least 600° C. and the saturation magnetic flux density also does not decrease. Moreover, this soft magnetic film is not only markedly excellent in corrosion resistance, but also a reaction product layer such as the oxide is formed with difficulty at the interface between the magnetic film and the ferrite and so, when this film is used for the magnetic head of a magnetic recording apparatus, especially magnetic head of a metal-in-gap type, glass bonding can be performed at a high temperature of 500° C. or higher and a glass layer having a sufficient strength can be formed. Besides, the contour signal output caused by contour gap effect is low, namely 2 dB or lower.

TABLE 1

| No. | Ferromagnetic metal film | Oxide | Coercivity (Oe) | Thermal stability (°C.) | Corrosion test (day) |
|---|---|---|---|---|---|
| 1 | Fe | $TiO_2$ | 0.8 | 600 | 70 |
| 2 | Fe | $Ti_2O_3$ | 0.9 | 600 | 74 |
| 3 | Fe | $ZrO_2$ | 0.9 | 600 | 58 |
| 4 | Fe | $HfO_2$ | 0.8 | 600 | 82 |
| 5 | Fe | $V_2O_3$ | 0.8 | 600 | 67 |
| 6 | Fe | $Nb_2O_5$ | 0.9 | 600 | 86 |
| 7 | Fe | $Ta_2O_5$ | 0.8 | 600 | 73 |
| 8 | Fe | $Cr_2O_3$ | 0.8 | 600 | 67 |
| 9 | Co | $Ti_2O_3$ | 0.8 | 600 | 93 |
| 10 | Co | $ZrO_2$ | 0.9 | 600 | 88 |
| 11 | Co | $HfO_2$ | 0.9 | 600 | 95 |
| 12 | Co | $V_2O_3$ | 0.8 | 600 | 87 |
| 13 | Co | $Nb_2O_5$ | 0.9 | 600 | 98 |
| 14 | Co | $Ta_2O_5$ | 0.8 | 600 | 94 |
| 15 | Co | $Cr_2O_3$ | 0.8 | 600 | 81 |
| 16 | $Fe_{70}Co_{30}$ | $Ti_2O_3$ | 0.9 | 600 | 84 |
| 17 | $Fe_{70}Co_{30}$ | $HfO_2$ | 0.9 | 600 | 76 |
| 18 | $Fe_{70}Co_{30}$ | $Nb_2O_5$ | 0.9 | 600 | 79 |
| 19 | $Fe_{70}Co_{30}$ | $Ta_2O_5$ | 0.8 | 600 | 82 |
| 20 | $Fe_{70}Co_{30}$ | $Cr_2O_3$ | 0.9 | 600 | 77 |

TABLE 2

| No. | Ferromagnetic film | Metal | Coercivity (Oe) | Crystallite size (Å) | Thermal stability (°C.) |
|---|---|---|---|---|---|
| 1 | $Fe_{95}O_5$ | Hf | 0.7 | 160 | 650 |
| 2 | $Fe_{95}O_5$ | Nb | 0.8 | 180 | 650 |
| 3 | $Fe_{95}O_5$ | Ta | 0.7 | 190 | 650 |
| 4 | $Fe_{95}O_5$ | Ti | 0.8 | 190 | 650 |
| 5 | $Fe_{95}O_5$ | Zr | 0.9 | 190 | 650 |
| 6 | $Fe_{95}O_5$ | V | 0.9 | 200 | 650 |
| 7 | $Fe_{95}O_5$ | W | 0.9 | 180 | 650 |
| 8 | $Fe_{95}O_5$ | Mo | 0.8 | 190 | 650 |
| 9 | $Fe_{90}B_4O_6$ | Nb | 0.6 | 160 | 650 |
| 10 | $Fe_{90}B_4O_6$ | Ta | 0.6 | 170 | 650 |
| 11 | $Fe_{90}C_4O_6$ | Nb | 0.7 | 170 | 650 |
| 12 | $Fe_{90}C_4O_6$ | Ta | 0.6 | 160 | 650 |
| 13 | $Fe_{88}N_6O_6$ | Nb | 0.8 | 180 | 650 |
| 14 | $Fe_{88}N_6O_6$ | Ta | 0.8 | 180 | 650 |
| 15 | $Co_{94}O_6$ | Ta | 0.8 | 170 | 650 |
| 16 | $Co_{95}O_5$ | Nb | 0.7 | 170 | 650 |
| 17 | $Co_{95}O_5$ | Zr | 0.9 | 190 | 650 |
| 18 | $Co_{95}O_5$ | Ti | 1.1 | 200 | 650 |
| 19 | $Co_{95}O_5$ | Hf | 0.8 | 170 | 650 |
| 20 | $Fe_{70}Co_{25}O_5$ | Ta | 0.9 | 180 | 650 |

TABLE 3

| No. | Ferromagnetic film | Oxygen concentration (%) | Coercivity (Oe) | Thermal stability (°C.) | Corrosion resistance (day) |
|---|---|---|---|---|---|
| 1 | $Fe_{95}Hf_5$ | 18 | 0.6 | 600 | 82 |
| 2 | $Fe_{90}Nb_{10}$ | 18 | 0.7 | 600 | 78 |
| 3 | $Fe_{95}Ta_5$ | 18 | 0.7 | 600 | 85 |
| 4 | $Fe_{95}Ti_5$ | 18 | 0.7 | 600 | 76 |
| 5 | $Fe_{85}Zr_{15}$ | 18 | 0.8 | 600 | 93 |
| 6 | $Fe_{95}V_5$ | 18 | 0.9 | 600 | 83 |
| 7 | $Fe_{95}W_5$ | 18 | 0.8 | 600 | 77 |
| 8 | $Fe_{95}Mo_5$ | 18 | 0.7 | 600 | 89 |
| 9 | $Fe_{92}Nb_5B_3$ | 15 | 0.7 | 600 | 91 |
| 10 | $Fe_{88}Nb_6C_6$ | 15 | 0.8 | 600 | 96 |
| 11 | $Fe_{90}Nb_6N_4$ | 15 | 0.8 | 600 | 75 |
| 12 | $Fe_{88}Ta_8B_4$ | 15 | 1.0 | 600 | 78 |
| 13 | $Fe_{88}Ta_8C_4$ | 15 | 0.9 | 600 | 80 |
| 14 | $Fe_{88}Ta_8N_4$ | 15 | 0.7 | 600 | 92 |
| 15 | $Co_{90}Ta_{10}$ | 25 | 0.8 | 600 | 90 |
| 16 | $Co_{95}Nb_5$ | 25 | 0.7 | 600 | 88 |
| 17 | $Co_{95}Zr_5$ | 25 | 0.7 | 600 | 76 |
| 18 | $Co_{95}Ti_5$ | 25 | 1.0 | 600 | 79 |
| 19 | $Co_{95}Hf_5$ | 25 | 0.8 | 600 | 69 |
| 20 | $Fe_{70}Co_{25}V_5$ | 15 | 0.9 | 600 | 73 |

What is claimed is:

1. A magnetic film comprising a magnetic metal including a magnetic metal crystal comprised of crystallites having an average crystallite size of 200 Å or less in which an oxide phase containing oxides of at least one element selected from elements of groups IVa, Va and VIa of the Periodic Table is present at the grain boundary portion of said crystallites, oxygen being present in the range of 0.1–15 atomic% in said oxide phase.

2. A ferromagnetic film according to claim 1, wherein said elements of Groups IVa, Va and VIa are selected from the group consisting of Hf, Nb, Ti, Zr, V, W, Mo, Ta and Cr.

3. A ferromagnetic film according to claim 1, wherein the ferromagnetic metal excluding the oxide phase comprises a crystal in a single phase.

4. A ferromagnetic film according to claim 1, wherein the ferromagnetic metal comprises a crystal mainly composed of Fe or Co.

5. A ferromagnetic film according to claim 1, wherein the amount of oxygen being present in said oxide phase is in the range of 0.1–10 at% based on the ferromagnetic metal.

6. A ferromagnetic film according to claim 1, which additionally contains at least one element for at least one of (1) decreasing coercivity and increasing specific permeability and (2) improving corrosion resistance.

7. A ferromagnetic film according to claim 1, having a coercivity of 5 Oe or less.

8. A ferromagnetic film according to claim 1, having a coercivity of 2 Oe or less.

9. A ferromagnetic film according to claim 1 which comprises at least one element selected from Fe and Co, at least one element selected from the elements of Groups IVa, Va and VIa, and 0.1-15 at% of oxygen in the oxide state.

10. A ferromagnetic film according to claim 9, wherein said elements of Groups IVa, Va and VIa are selected from the group consisting of Hf, Nb, Ti, Zr, V, W, Mo, Ta and Cr.

11. A multi-layer magnetic film which comprises a laminate comprising magnetic metal layers and intermediary layers containing oxides of at least one element selected from the elements of groups IVa, Va and VIa wherein the magnetic metal layers comprise a magnetic metal including a magnetic metal crystal comprised of crystallites having an average crystallite size of 200 Å or less in which an oxide phase containing oxides of at least one element selected from elements of groups IVa, Va and VIa of the Periodic Table is present at the grain boundary portion of said crystallites, oxygen being present in the range of 0.1-15 atomic% in said oxide phase.

12. A multi-layer magnetic film according to claim 11, wherein the ferromagnetic metal layer is mainly composed of Fe or Co.

13. A multi-layer magnetic film according to claim 11, wherein the thickness of the intermediary layers is 1 nm or more.

14. A multi-layer magnetic film according to claim 11, wherein said elements of Groups IVa, Va and VIa are selected from the group consisting of Hf, Nb, Ti, Zr, V, W, Mo, Ta and Cr.

15. A multilayer magnetic film which comprises a laminate comprising magnetic metal layers to which oxygen is added and an intermediary layer containing at least one element selected from the elements of groups IVa, Va and VIa of the Periodic Table wherein the magnetic metal layers comprise a magnetic metal including a magnetic metal crystal comprised of crystallites having an average crystallite size of 200 Å or less in which an oxide phase containing oxides of at least one element selected from elements of groups IVa, Va and VIa of the Periodic Table is present at the grain boundary portion of said crystallites, oxygen being present in the range of 0.1-15 atomic≡in said oxide phase.

16. A multi-layer magnetic film according to claim 15, wherein the ferromagnetic metal film is mainly composed of Fe or Co.

17. A multi-layer magnetic film according to claim 15, wherein the thickness of the intermediary layer is 1 nm or more.

18. A multi-layer magnetic film according to claim 15, wherein said elements of Groups IVa, Va and VIa are selected from the group consisting of Hf, Nb, Ti, Zr, V, W, Mo, Ta and Cr.

* * * * *